(12) United States Patent
Kim et al.

(10) Patent No.: US 11,178,734 B2
(45) Date of Patent: Nov. 16, 2021

(54) COOKING APPLIANCE, DOOR FOR COOKING APPLIANCE AND METHOD FOR MANUFACTURING DOOR OF COOKING APPLIANCE

(71) Applicant: SAMSUNG ELECTRONICS CO., LTD., Suwon-si (KR)

(72) Inventors: Jee Yong Kim, Suwon-si (KR); Jin O Kim, Seoul (KR); Ki Du Kim, Suwon-si (KR); Kyung Sun Min, Yongin-si (KR); Myung Ju Shin, Suwon-si (KR); Ah Hyun Bae, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 508 days.

(21) Appl. No.: 15/661,835

(22) Filed: Jul. 27, 2017

(65) Prior Publication Data
US 2018/0054860 A1 Feb. 22, 2018

(30) Foreign Application Priority Data

Aug. 22, 2016 (KR) .................. 10-2016-0106317

(51) Int. Cl.
| | | |
|---|---|---|
| *B23P 19/00* | (2006.01) | |
| *H05B 6/76* | (2006.01) | |
| *H05B 6/64* | (2006.01) | |

(52) U.S. Cl.
CPC .............. *H05B 6/766* (2013.01); *B23P 19/00* (2013.01); *H05B 6/6417* (2013.01)

(58) Field of Classification Search
CPC ........ H05B 6/766; H05B 6/6417; H05B 6/76; H05B 6/6414
(Continued)

(56) References Cited

U.S. PATENT DOCUMENTS 4,010,343 A * 3/1977 Tanaka .................. H05B 6/763
219/740
4,283,513 A * 8/1981 Mikami ............. C08G 59/4085
525/476

(Continued)

FOREIGN PATENT DOCUMENTS

| EP | 2020827 | 2/2009 | |
|---|---|---|---|
| GB | 2240884 A * | 8/1991 | .......... H05K 9/0015 |

(Continued)

OTHER PUBLICATIONS

International Search Report dated Oct. 30, 2017 in International Patent Application No. PCT/KR2017/007237.
(Continued)

*Primary Examiner* — Christopher M Koehler
*Assistant Examiner* — Simpson A Chen
(74) *Attorney, Agent, or Firm* — Staas & Halsey, LLP

(57) ABSTRACT

A cooking appliance having an improved structure capable of improving visibility to enable a user to clearly look at the inside of the cooking chamber during cooking includes a main body having the cooking chamber and a door disposed at the main chamber to open or close the cooking chamber, the door including a shielding member woven with conductive wires and a fixing member to electrically connect the shielding member with a door frame of the door. Electromagnetic waves generated in the cooking chamber can be prevented from leaking to the outside.

13 Claims, 19 Drawing Sheets

(58) Field of Classification Search
USPC ....... 219/740; 427/96.3, 117, 118, 452, 563, 427/740
See application file for complete search history.

(56) References Cited

U.S. PATENT DOCUMENTS

| | | | | |
|---|---|---|---|---|
| 4,390,767 | A * | 6/1983 | Bucksbaum | H05B 6/763 126/200 |
| 5,301,737 | A * | 4/1994 | Martin | E06B 9/52 160/380 |
| 5,406,057 | A * | 4/1995 | Komatsu | H05B 6/6414 219/740 |
| 5,789,724 | A * | 8/1998 | Lerssen | H05B 6/766 126/200 |
| 6,675,449 | B2 * | 1/2004 | Wales | A44B 99/00 24/559 |
| 7,053,348 | B1 * | 5/2006 | Terada | H05B 6/763 126/198 |
| 2004/0149748 | A1 | 8/2004 | Leutner et al. | |
| 2010/0168308 | A1 * | 7/2010 | Miyahara | C09D 7/61 524/413 |
| 2014/0000184 | A1 * | 1/2014 | Armstrong | E04C 3/02 52/105 |
| 2016/0085944 | A1 * | 3/2016 | Brophy | G01N 33/386 702/22 |
| 2019/0048209 | A1 * | 2/2019 | Fish | C09D 183/14 |

FOREIGN PATENT DOCUMENTS

| | | |
|---|---|---|
| GB | 2262208 | 6/1993 |
| GB | 2322276 | 8/1998 |
| JP | 5-26457 | 2/1993 |
| JP | 2001-237061 | 8/2001 |
| JP | 2005-273977 | 10/2005 |
| JP | 2006-162170 | 6/2006 |
| KR | 1986-0000845 | 5/1986 |
| KR | 10-2004-0090786 | 10/2004 |
| KR | 20-2009-0003022 | 3/2009 |

OTHER PUBLICATIONS

Chinese Office Action dated Dec. 18, 2019 in Chinese Patent Application No. 201780050680.X.
Extended European Search Report dated Jun. 28, 2019 in European Patent Application No. 17843810.7.
European Communication dated Feb. 12, 2021 in European Patent Application No. 17843810.7.

* cited by examiner

COOKING APPLIANCE, DOOR FOR COOKING APPLIANCE AND METHOD FOR MANUFACTURING DOOR OF COOKING APPLIANCE

CROSS-REFERENCE TO RELATED APPLICATIONS

This application claims the priority benefit of Korean Patent Application No. 10-2016-0106317, filed on Aug. 22, 2016, in the Korean Intellectual Property Office, the disclosure of which is incorporated herein by reference in its entirety.

BACKGROUND

1. Field

Embodiments of the disclosure relate to a cooking appliance having an improved structure capable of improving visibility to enable a user to clearly look at the inside of the cooking chamber during cooking, while preventing electromagnetic waves generated in the cooking chamber from leaking to the outside.

2. Description of the Related Art

A microwave oven is a cooking appliance that heats food using the properties of electromagnetic waves called microwaves. The microwave oven generates heat from the inside of food by a dielectric heating method to warm the food up.

When electromagnetic waves having a high frequency impinge against a food, water molecules in the food rotate to disrupt the molecular arrangement of the food. The microwave oven heats food using heat generated when water molecules rotate.

Generally, since the inside of the cooking chamber of the microwave oven is not clearly seen from the outside during cooking, a user should open the door in order to check the cooking process.

SUMMARY

Therefore, it is an aspect of the disclosure to provide a cooking appliance including a door of an improved structure capable of improving visibility to enable a user to clearly look at the inside of a cooking chamber during cooking.

It is another aspect of the disclosure to provide a method of fixing a shielding member at a door to enable a user to clearly look at the inside of a cooking chamber while preventing leakage of electromagnetic waves generated in the cooking chamber.

Additional aspects of the disclosure will be set forth in part in the description which follows and, in part, will be apparent from the description, or may be learned by practice of the disclosure.

In accordance with an aspect of the disclosure, there is provided a cooking appliance including: a main body having a cooking chamber, and a door configured to open or close the cooking chamber. The door may include: a door frame having an opening, a shielding member disposed at the door frame, configured to cover the opening of the door frame and having a plurality of conductive wires crossing each other and a heat-resistant coating, and a fixing member having an opening corresponding to the opening of the door frame and coupled with the door frame with the shielding member in between.

The plurality of conductive wires may have a diameter of 0.1 mm to 0.14 mm, and 30 to 50 wires per inch may be arranged side by side.

The plurality of conductive wires may include a first wire arranged in a first direction and a second wire arranged in a second direction. A diameter of the first wire may be different from a diameter of the second wire. The number of the first wire arranged per inch may be different from the number of the second wire arranged per inch.

The plurality of conductive wires may include at least one of stainless steel, platinum, copper, nickel, chromium, titanium, and carbon nanotubes.

A thickness of the heat-resistant coating may be between 0.01 mm and 0.03 mm.

The heat-resistant coating may include silicon, and the content of silicon may be between 2% and 10%.

The heat-resistant coating may include a matting agent. The content of the matting agent is 10% or less.

The door may include a screen disposed on one side of the shielding member and formed of a transparent material. The screen may be spaced a predetermined distance from the shielding member.

The screen may include an antireflective layer on a side facing the shielding member.

The fixing member further may include a protrusion protruding toward the door frame. The door frame may further include a recess into which the protrusion is inserted. The shielding member may be pressed by the protrusion to be inserted into the recess.

The fixing member may further include a reinforcing portion crossing the opening of the fixing member.

In accordance with an aspect of the disclosure, there is provided a method for manufacturing a door of a cooking appliance including: resting a door frame, including an opening and a conductive flange formed around the opening on a lower jig, resting a shielding member woven with conductive wires on the door frame to cover the opening, resting a fixing member having a shape corresponding to the flange of the door frame on an upper jig, coupling the lower jig with the upper jig so that the shielding member is disposed between the fixing member and the door frame, coupling the fixing member with the door frame such that the shielding member is electrically connected to the flange of the door frame, and separating the lower jig and the upper jig from the door frame and the fixing member.

The fixing member may be welded to the flange of the door frame.

The upper jig may include a flat portion to keep the shielding member flat and to prevent a foreign material from entering the shielding member and an opening to weld the fixing member to the flange of the door frame.

The upper jig may include a barrier formed between the opening and the flat portion to prevent contamination due to by-products due to welding.

In accordance with an aspect of the disclosure, there is provided a cooking appliance including: a main body having a cooking chamber, and a door configured to open or close the cooking chamber. The door may include: a door frame having an opening, a conductive flange formed around the opening, and a recess provided in the flange, a conductive shielding member covering the opening of the door frame and disposed to contact the flange, and a fixing member having a shape corresponding to the flange of the door frame and including a protrusion configured to be inserted into the recess of the door frame with the shielding member in between.

In accordance with an aspect of the disclosure, there is provided a cooking appliance including: a main body having a cooking chamber, a door configured to open or close the cooking chamber and having a door frame provided with an opening, a shielding member including a conductive wire mesh and disposed at the door frame to cover the opening of the door frame, and a groove which is formed around the opening of the door frame and into which at least one end of the shielding member is inserted.

In accordance with an aspect of the disclosure, there is provided a cooking appliance including: a main body having a cooking chamber, a door configured to open or close the cooking chamber and having a door frame provided with an opening, a shielding member including a conductive wire mesh and disposed at the door frame to cover the opening of the door frame, and a pressing member formed around the opening of the door frame, and configured to press and fix at least one end of the shielding member.

In accordance with an aspect of the disclosure, there is provided a door for a cooking appliance including: a door frame having an opening, a shielding member disposed at the door frame to cover the opening of the door frame and having a plurality of conductive wires crossing each other and a heat-resistant coating, and a fixing member having an opening corresponding to the opening of the door frame and coupled with the door frame with the shielding member in between.

The plurality of conductive wires may include a first wire arranged in a first direction and a second wire arranged in a second direction. A diameter of the first wire may be different from a diameter of the second wire. The number of the first wire arranged per inch may be different from the number of the second wire arranged per inch.

The door may further include a screen disposed on one side of the shielding member and formed of a transparent material. The screen may be spaced a predetermined distance from the shielding member.

The fixing member may further include a protrusion protruding toward the door frame. The door frame may further include a recess into which the protrusion is inserted. The shielding member may be pressed by the protrusion to be inserted into the recess.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
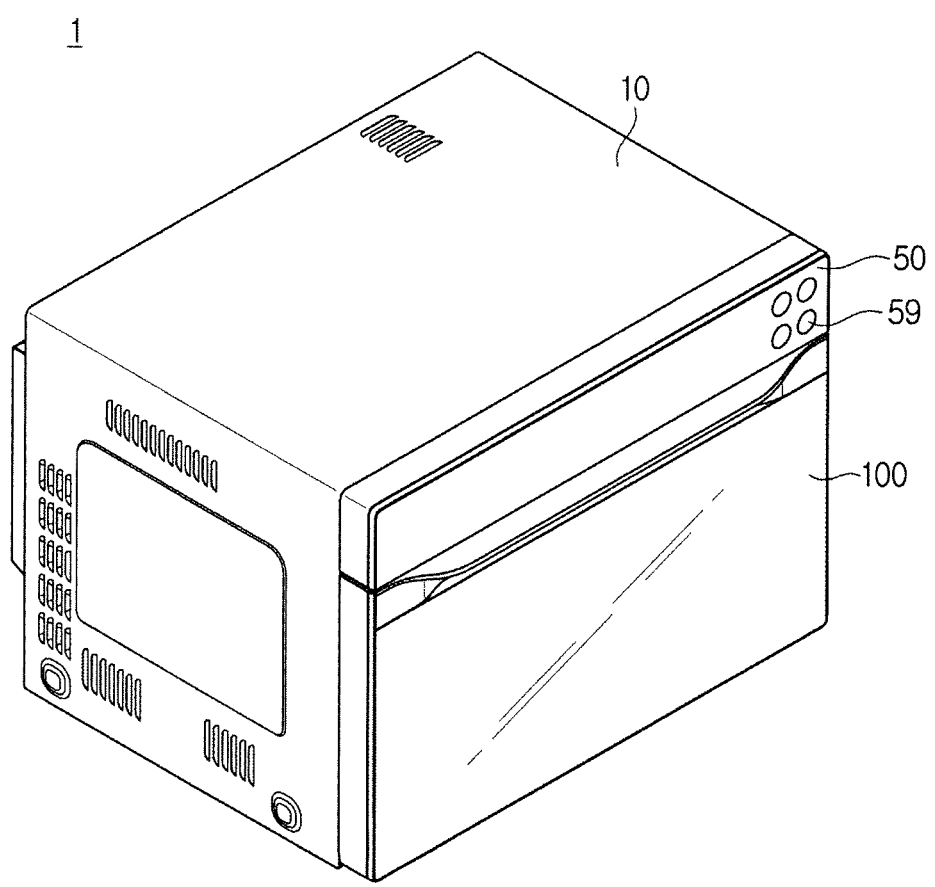
FIG. 1 is a perspective view illustrating an appearance of a cooking appliance according to an embodiment of the disclosure.

Reference will now be made in detail to example embodiments which are illustrated in the accompanying drawings, wherein like reference numerals refer to like elements throughout. The embodiments are described below to explain the disclosure by referring to the figures.

Hereinafter, a cooking appliance according to the disclosure, a door for the cooking appliance and a method for manufacturing the door of the cooking appliance will be described in detail with reference to the accompanying drawings. In the following description, it is to be understood that the singular forms "a," "an," and "the" include plural referents unless the context clearly dictates otherwise. Also, for convenience of description, the shapes and sizes of elements may be more or less exaggeratedly shown in the drawings.

Figure 2:
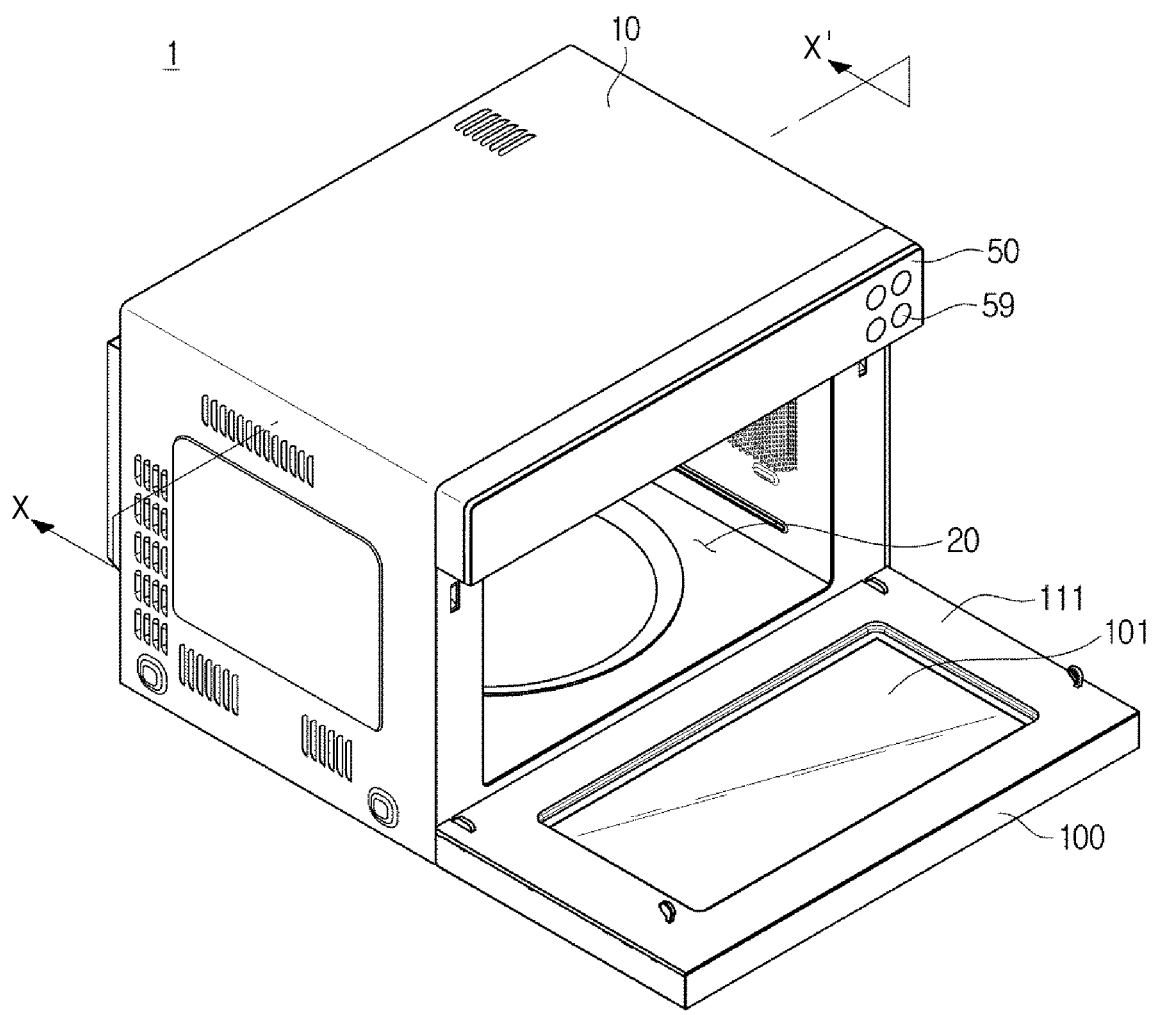
FIG. 2 is a perspective view illustrating a cooking appliance according to an embodiment of the disclosure when a door is opened.

FIG. 1 is a perspective view illustrating an appearance of a cooking appliance according to an embodiment of the disclosure, and FIG. 2 is a perspective view illustrating a cooking appliance according to an embodiment of the disclosure when a door is opened.

As shown in FIGS. 1 and 2, a cooking appliance 1 may include a main body 10 forming an outer appearance of the cooking appliance 1, and a cooking chamber 20 having space for cooking food inside the main body 10. Hereinafter, for convenience of description, a direction in which a door 100 is installed with respect to the cooking appliance) is defined as a front direction.

The cooking chamber 20 may be provided inside the main body 10. The cooking chamber 20 may be spaced inward from the main body 10 by a predetermined distance.

A machine room 30 may be formed in the inside of the main body 10. In the machine room 30, electrical components for operating the cooking appliance 1 may be installed. The machine room 30 may be formed in space formed between the cooking chamber 20 and the main body 10 above the cooking chamber 20. The front portion of the cooking chamber 20 may open. The open front portion of the cooking chamber 20 may be opened or closed by the door 100. The door 100 may be hinge-connected to one edge of the front surface of the main body 10 to open or close the cooking chamber 20.

The door 100 may include a viewing window 101 in the front portion to enable a user to look at the inside of the cooking chamber 20 when the cooking chamber 20 is closed. The user can check the cooking process during cooking through the viewing window 101 provided in the door 100.

The cooking chamber 20 may be formed by combining a plurality of plates. According to an example, the cooking chamber 20 may include side plates forming side portions of the cooking chamber 20, a top plate forming a top portion of the cooking chamber 20, and a bottom plate forming a bottom portion of the cooking chamber 20. The side plates, the top plate, and the bottom plate may be connected by welding. Alternatively, the side plates, the top plate, and the bottom plate may be coupled by screwing. Also, the cooking chamber 20 may be formed by bending a single plate.

A control panel 50 may be mounted on the front upper portion of the cooking appliance 1. The control panel 50 may be provided to operate the electrical components provided in the machine room 30.

The control panel 50 may include an input unit 59 and a display unit (not shown). The input unit 59 may enable the user to input commands for operations of the cooking appliance 1, such as a cooking function, a cooking mode, and a cooking time. According to an example, the input unit 59 may include a plurality of switches to enable the user to select a cooking mode. The plurality of switches may operate by a touch sensing method.

The display unit may display conditions set by the user and operation states according to the conditions with letters, numbers, and symbols.

Figure 3:
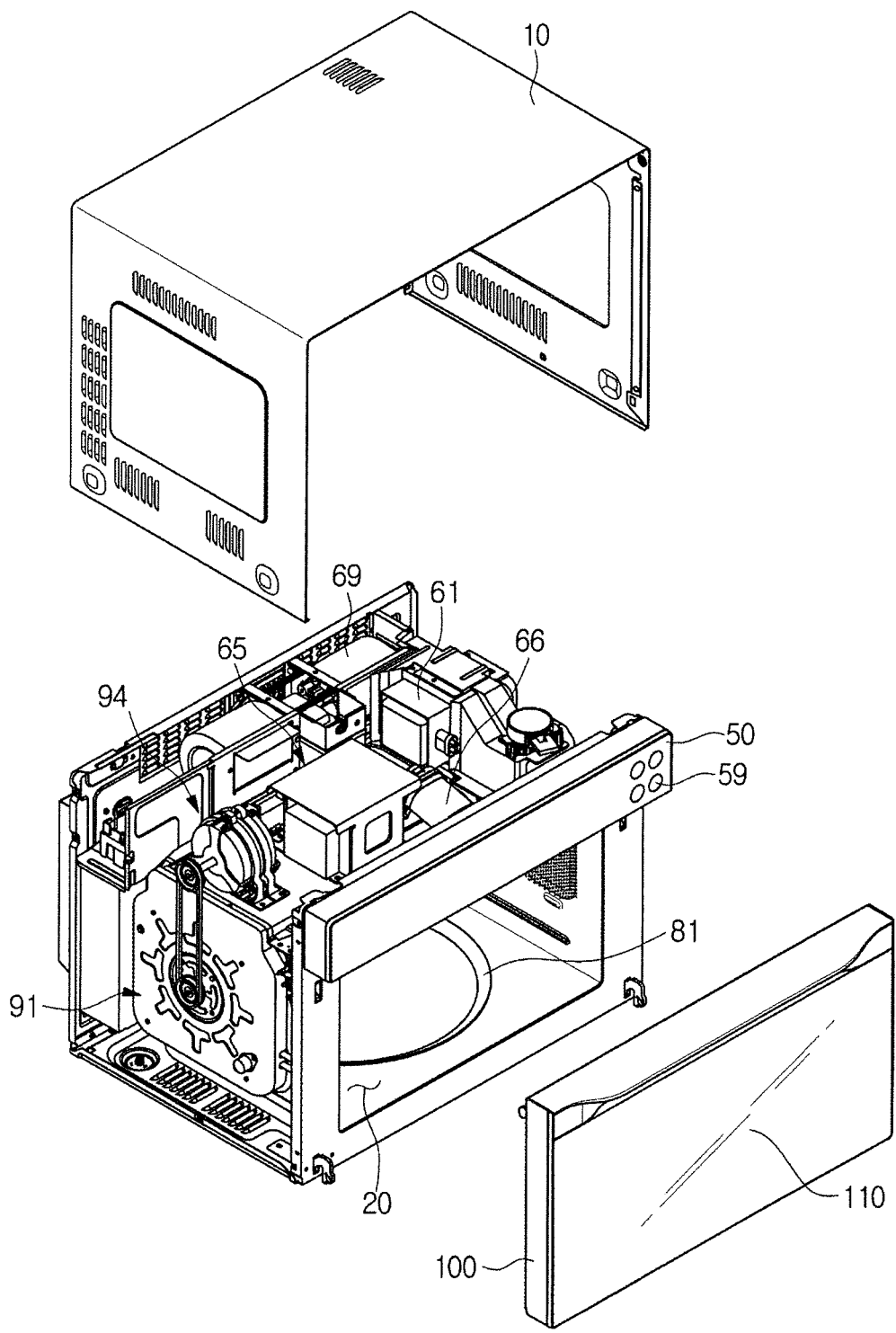
FIG. 3 is an exploded perspective view illustrating the cooking appliance according to an embodiment of the disclosure when the door is separated from the main body.
Figure 4:
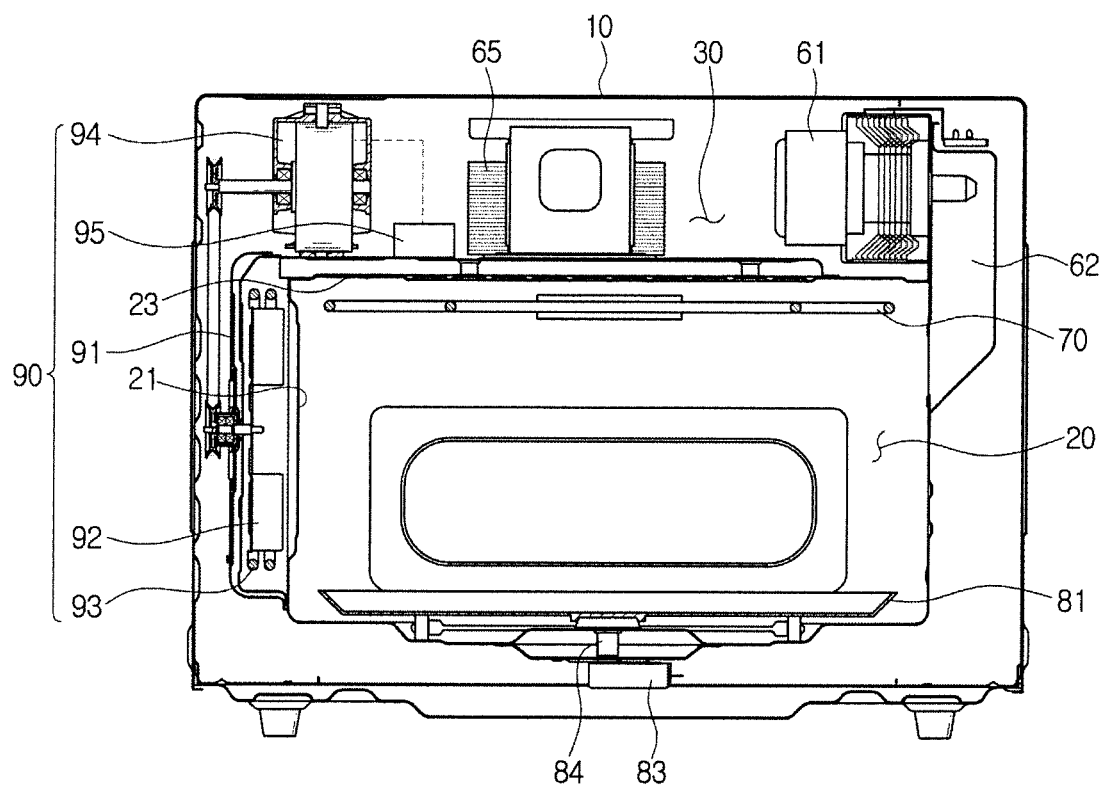
FIG. 4 is a cross-sectional view of the cooking appliance shown from line X-X' of FIG. 2.

FIG. 3 is an exploded perspective view illustrating the cooking appliance according to an embodiment of the disclosure when the door is separated from the main body, and FIG. 4 is a cross-sectional view of the cooking appliance shown from line X-X' of FIG. 2.

Referring to FIGS. 3 and 4, the cooking appliance 1 may include a magnetron 61 to generate microwaves. The magnetron 61 may be provided in the machine room 30, and may generate microwaves to be radiated into the cooking chamber 20.

According to an example, the magnetron 61 may be installed on the outer surface of the top plate 23 of the cooking chamber 20. Microwaves generated by the magnetron 61 may be irradiated to the inside of the cooking chamber 20 through a wave guide 62. One side of the wave guide 62 may be connected to the magnetron 61, and the opposite side of the wave guide 62 may be connected to one side surface of the cooking chamber 20.

In the machine room 30, a high-voltage transformer (HVT) 65, a high-voltage condenser 66, a high-voltage diode (not shown), a noise filter 69, etc. may be installed to constitute a driving circuit for driving the magnetron 61. The high-voltage transformer 65, the high-voltage condenser 66, the high-voltage diode (not shown), and the noise filter 69 may be installed on the outer surface of the top plate 23 of the cooking chamber 20. All of the magnetron 61, the high-voltage transformer 65, the high-voltage condenser 66, the high-voltage diode (not shown), and the noise filter 69 may be disposed in the machine room 30 provided in the upper portion of the cooking chamber 20.

Although not shown in the drawings, a cooling fan (not shown) for blowing inside air of the machine room 30 to the outside of the cooking appliance 1 may be disposed in the machine room 30. The cooling fan may move heat generated from the electrical components, such as the magnetron 61, the high-voltage transformer 65, and the high-voltage condenser 66, provided in the machine room 30, to the outside of the cooking appliance 1.

According to an example, the electrical components, such as the magnetron 61, the high-voltage transformer 65, the high-voltage condenser 66, the high-voltage diode (not shown), and the noise filter 69, may be disposed in the machine room 30 located above the cooking chamber 20. Therefore, the cooking chamber 20 can occupy wide space in the internal space of the main body 10. Accordingly, the internal space of the main body 10 can be efficiently used.

The cooking appliance 1 may further include a grill heater 70 to cook food by supplying radiant heat to the food. The grill heater 70 may be located inside the cooking chamber 20. The grill heater 70 may be positioned above the cooking chamber 20. The grill heater 70 may be disposed to face the upper surface of the cooking chamber 20. The grill heater 70 may generate radiant heat, and transfer the generated radiant heat to food to cook the food.

In the inside of the cooking chamber 20, a tray 81 to place food to be cooked thereon may be provided. The tray 81 may be connected to a driving member 83 arranged outside the cooking chamber 20 through a connecting part 84. The driving member 83 may generate a driving force capable of rotating the tray 81. The driving force generated by the driving member 83 may be transmitted to the tray 81 through the connecting part 84 to rotate the tray 81. Alternatively, the driving member 83 may not be provided.

The cooking appliance 1 may further include a hot air discharge unit 90 for providing hot air to food to cook it. The hot air discharge unit 90 may generate hot air that is supplied to the inside of the cooking chamber 20. The hot air discharge unit 90 may be configured to discharge hot air to the inside of the cooking chamber 20 so that the hot air collides directly with food and transfers heat to the food.

Referring to FIGS. 3 and 4, the hot air discharge unit 90 may include a duct member 91 to guide high temperature air to move in a specific direction outside the cooking chamber 20. The duct member 91 may communicate with the cooking chamber 20 through surface 21.

The hot air discharge unit 90 may further include a heater 93 to heat inside air of the duct member 91 so as to cook food, a blowing fan 92 to blow air heated by the heater 93, a motor 94 to provide a driving force to the blowing fan 92, and a controller 95 to adjust rotational speed of the motor 94.

Figure 5:
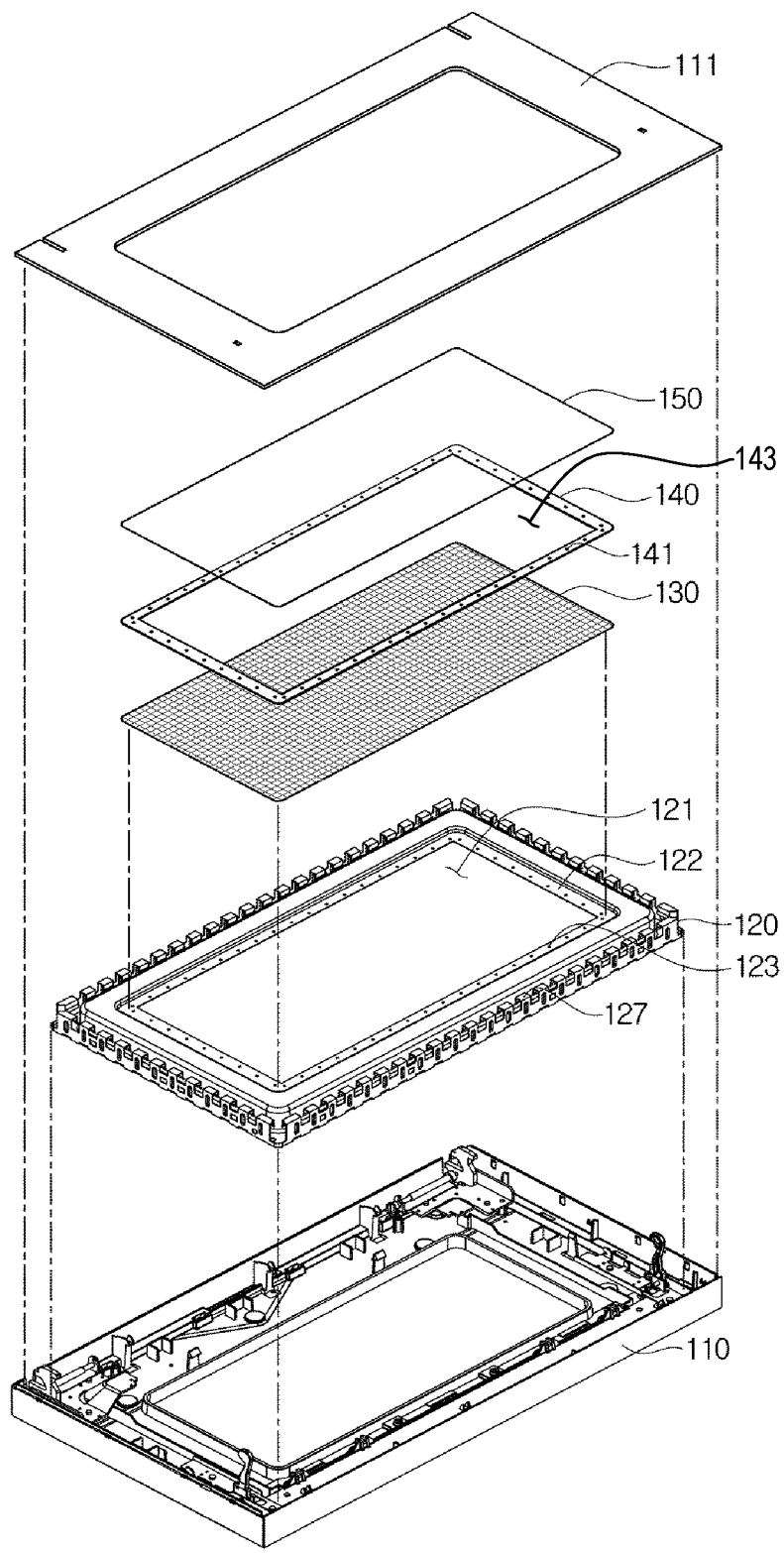
FIG. 5 is an exploded perspective view of the door of the cooking appliance according to an embodiment of the disclosure.

FIG. 5 is an exploded perspective view of the door of the cooking appliance according to an embodiment of the disclosure.

Referring to FIG. 5, the door 100 of the cooking appliance 1 may include a casing 110 forming an outer appearance of the door 100, and a door frame 120 disposed inside the casing 110. The casing 110 may be generally made of polycarbonate by injection molding. The rear surface of the casing 110 may be provided with a cover 111 so that the door frame 120 is not exposed. Hereinafter, the rear surface of the casing 110 with respect to the door frame 120 is defined as a up direction, for convenience of description.

The door frame 120 may include an opening 121 through which a user can look at the inside of the cooking chamber 20 when the door 100 is closed, wherein the opening 121 corresponds to the viewing window 101 of the door 100.

The cooking appliance 1 may include the magnetron 61 for generating microwaves. The magnetron 61 may emit electromagnetic waves called microwaves into the cooking chamber 20 when the cooking appliance 1 operates. Therefore, it is important to prevent electromagnetic waves in the cooking chamber 20 from leaking out through the viewing window 101 of the door 100 during cooking.

Conventionally, a shielding panel with multiple piercing holes having a constant pitch has been used to prevent electromagnetic waves from leaking out. However, the conventional shielding panel does not clearly show the inside of the cooking chamber 20 during cooking so that a user should open a door to check a cooking process.

The door 100 of the cooking appliance 1 according to the disclosure may have a structure for improving visibility of the inside of the cooking chamber 20 by using a wire mesh woven with conductive wires as a shielding member, instead of the multiple piercing hole panel.

Referring to FIG. 5, a shielding member 130 configured to block electromagnetic waves may be disposed on the upper portion of the door frame 120 to cover the opening 121 of the door frame 120.

The shielding member 130 may be formed of a wire mesh woven with conductive wires so that the user can look at the inside of the cooking chamber 20 through the opening 121 of the door frame 120. That is, the shielding member 130 may include a plurality of conductive wires intersecting with each other. The wires may be formed of one or more of stainless steel, platinum, copper, nickel, chromium, titanium, and carbon nanotubes. A method of weaving the wires will be described later.

In the door frame 120, a flange 122 around the opening 121 contacting the shielding member 130 may have conductivity.

The flange 122 of the opening 121 of the door frame 120 may be formed by applying a conductive material on the flange 122 in order to have conductivity, or the door frame 120 itself may be formed of a conductive material. When the door frame 120 itself is formed of a conductive material, the flange 122 of the opening 121 of the cooking appliance 1 should not be coated such that the conductive material is exposed. According to an embodiment, the door frame 120 may be manufactured by bending using a cold-rolled galvanized steel sheet for machining.

Since the shielding member 130 having conductivity is in contact with and electrically connected to the flange 122 of the door frame 120, electromagnetic waves generated in the cooking chamber 20 may not pass through the shielding member 130, and may make a detour to the door frame 120 by a barrier layer 133 of the shielding member 130.

Since the space between the conductive wires of the shielding member 130 is sufficiently smaller than the wavelength of the electromagnetic waves, the electromagnetic waves cannot pass through the barrier layer 133 to flow in the form of displacement current to the flange 122 of the door frame 120 electrically connected to the shielding member 130. The electromagnetic waves of the current flowing to the door frame 120 may be shielded by the choke structure of the door frame 120. The choke structure of the door frame 120 may include a choke portion 127 which extends from the flange 122 and is bent. The choke portion 127 may be formed as a cavity having a length of ¼ of the wavelength of electromagnetic waves generated from the inside of the cooking chamber 20. Cooking appliances using electromagnetic waves need to meet the UL 923 standard, which is an international standard for electromagnetic shielding. According to the UL 923 standard, the shielding member 130 of the cooking appliance 1 according to the disclosure may be configured such that the Plane-wave power density does not exceed 5 mW per square centimeter when electromagnetic waves are measured at a distance of 5 cm from the outer surface.

To securely and electrically connect the shielding member 130 to the flange 122 of the door frame 120, to keep the flexible shielding member 130 flat, and to fix the shielding member 130 at a specific position for a long period of use, a fixing member 140 coupled to the door frame 120 with the shielding member 130 in between may be disposed above the shielding member 130 in the door 100.

The fixing member 140 may be manufactured by pressing a panel including at least one of stainless steel (SUS), electro-galvanized steel sheet (EGI), and hot-dip galvanized steel sheet (GI). The fixing member 140 may be formed in a shape corresponding to the flange 122 of the door frame 120. The fixing member 140 may include an opening 143 corresponding to the opening 121 of the door frame 120. The fixing member 140 may include an engaging portion 141 which can be engaged with an engaged portion 123 of the door frame 120.

The fixing member 140 may be welded to the door frame 120. The engaging portion 141 of the fixing member 140 may be engaged with the engaged portion 123 of the door frame 120 by welding. The engaging portion 141 of the fixing member 140 may be welded to the engaged portion 123 of the door frame 120 through the shielding member 130 so that the fixing member 140, the shielding member 130, and the door frame 120 may be combined with each other.

Figure 6:
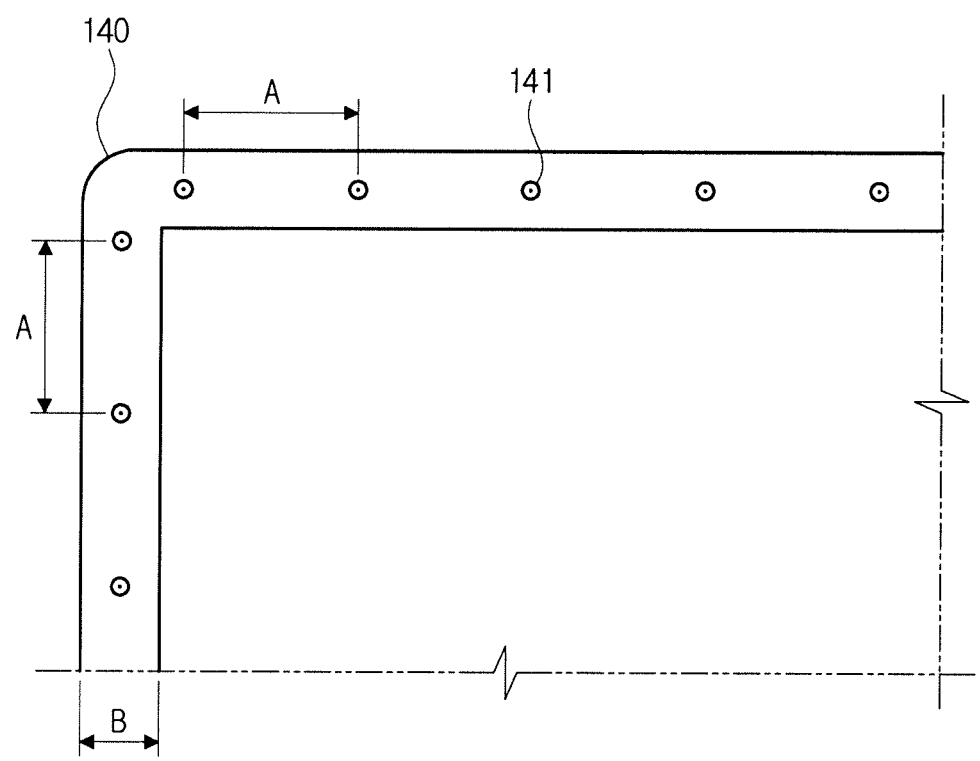
FIG. 6 is an enlarged view of a part of the fixing member.

FIG. 6 is an enlarged view of a part of the fixing member.

The fixing member 140 may have a width B of 3 mm or more and a thickness of 0.8 mm or less in consideration of welding strength and conductivity. The flange 122 of the door frame 120 may be formed to have a width of 3 mm or more that is equal to that of the fixing member 140.

An interval at which the fixing member 140 is welded to the door frame 120, that is, an interval A between engaging portions 141 or an interval between engaged portions 123 provides a criteria about a minimum interval at which the shielding member 130 needs to be electrically connected to the door frame 120. In order to ensure a minimum interval of 60 mm at which the shielding member 130 needs to be electrically connected to the door frame 120 while preventing electromagnetic waves generated in the cooking chamber 20 from leaking out, the engaging portions 141 of the fixing member 140 may be arranged at an interval A of 60 mm or less.

Unlike the drawing, the fixing member 140 may be coupled to the door frame 120 by line welding, instead of spot welding in which the engaging portions 141 are arranged at regular intervals. However, in the case of line welding, the length of a section not welded may need to be 60 mm or less.

Figure 7:
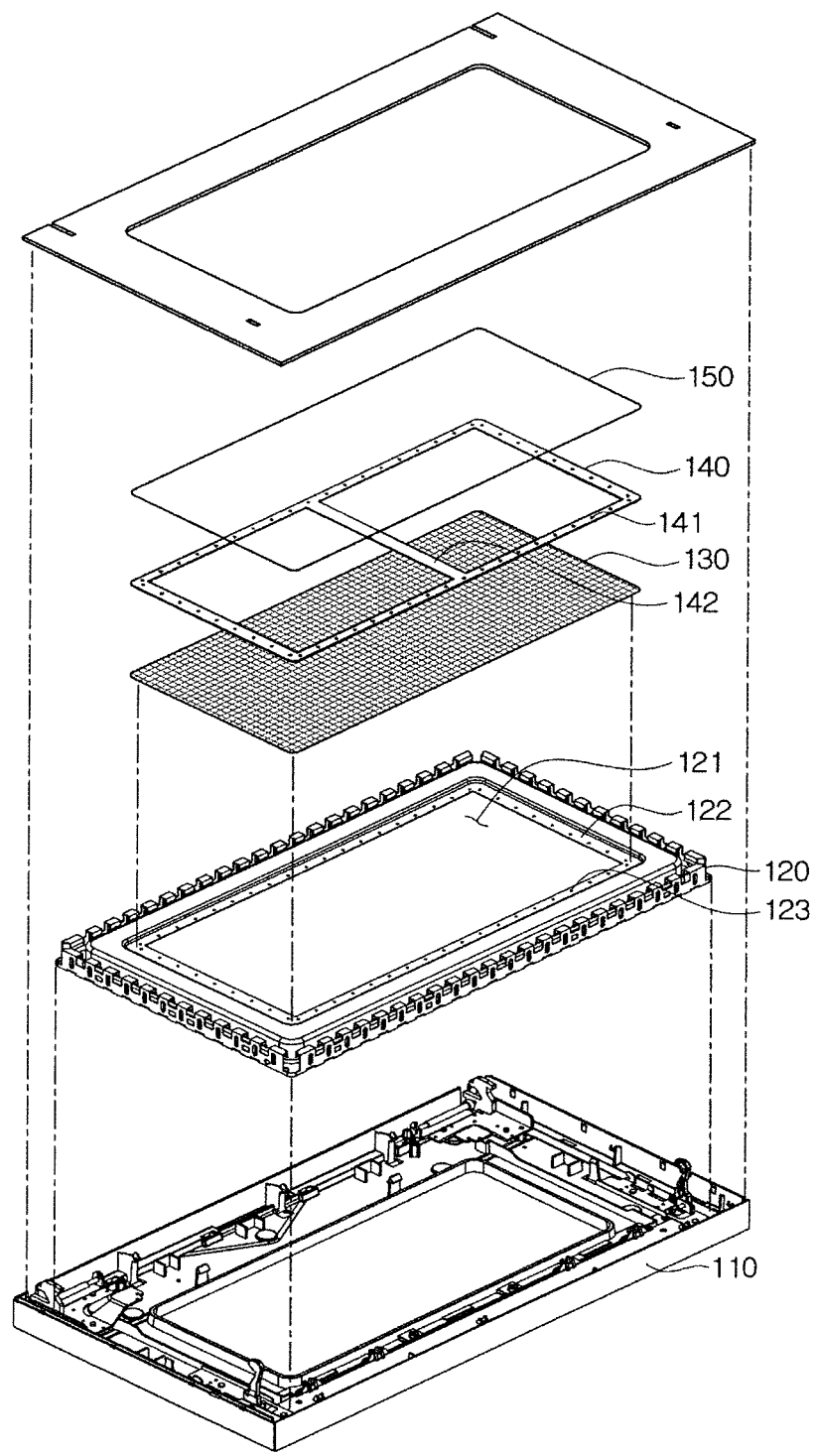
FIG. 7 is an exploded perspective view of a door of a cooking appliance according to another embodiment of the disclosure.

FIG. 7 is an exploded perspective view of a door of a cooking appliance according to another embodiment of the disclosure.

The fixing member 140 may further include a reinforcing portion 142 crossing the opening 143 of the fixing member 140 to reinforce the flatness of the flexible shielding member 130. The reinforcing portion 142 may be provided in any direction and in any number, and may have any width.

Referring to FIG. 5, the door 100 may include at least one screen 150 (hereinafter, also referred to as a first screen) disposed on one side of the shielding member 130 to protect the shielding member 130 from external impacts such as spattering of food inside the cooking chamber 20. The screen 150 may be made of a transparent material, preferably, a glass material.

The first screen 150 may be disposed above the fixing member 140 for fixing the shielding member 130, and may cover the engaging portion 141 of the fixing member 140 to protect the shielding member 130 while protecting the coupling of the fixing member 140 with the door frame 120.

Although not shown in FIG. 5, a second screen may be disposed below the door frame 120 to prevent the shielding member 130 from being damaged by foreign substances entered the inside of the casing 110.

Figure 8A:
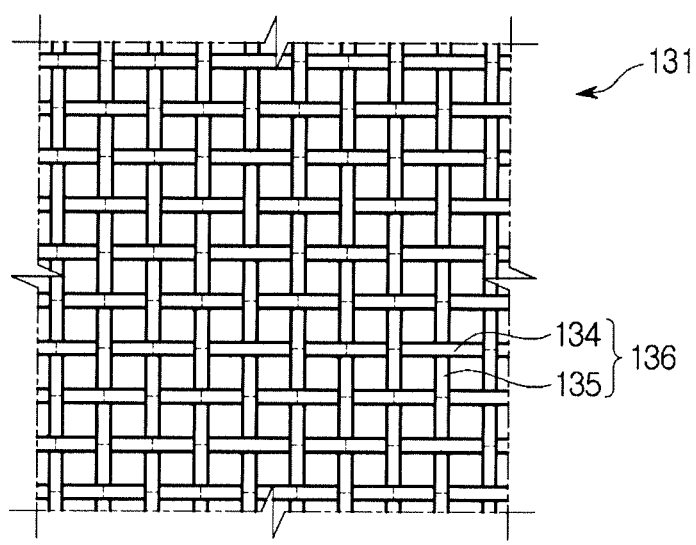
FIGS. 8A to 8C are views for describing a method of weaving a shielding member according to an embodiment of the disclosure.
Figure 8B:
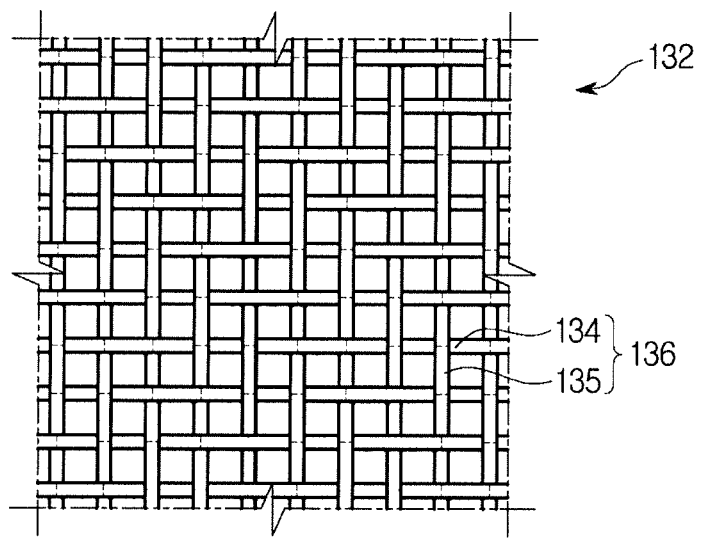
Figure 8C:
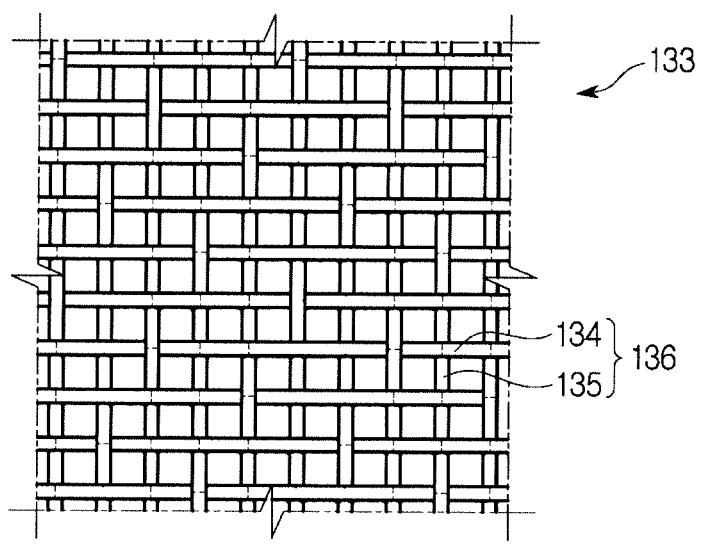

FIGS. 8A to 8C are views for describing a method of weaving a shielding member according to an embodiment of the disclosure.

The shielding member 130 may be woven in one or more of a plain weave 131 shown in FIG. 8A, a twill weave 132 shown in FIG. 8B, and a satin weave 133 shown in FIG. 8C depending on weaving methods. The plain weave 131 is the most basic structure in which warp yarns 135 cross weft yarns 134 alternately, and intersections are very dense to ensure structural stability. The twill weave 132 is a weave in which one weft yarn 134 passes over and under two warp yarns 135 and one yarn is crossed on each line to form a shape of oblique line. The satin weave 133 is a weave which is loosely woven such that one weft yarn 134 passes over four or more warp yarns 135 and passes under one warp yarn 135 to form a smooth surface.

The plain weave 131 may have high visibility since it forms no special pattern compared to the twill weave 132 and the satin weave 133. The twill weave 132 and the satin weave 133 are more advantageous than the plain weave 131 in view of flatness, and may be applied when a special pattern is required.

In regard of the electromagnetic wave shielding performance of the shielding member 130, a microwave leakage value may be preferably 0.4 mW or less per square centimeter in order to ensure safety. More preferably, the microwave leakage value may be 0.2 mW or less per square centimeter, since a user can have a closer look at the inside of the cooking chamber 20 if visibility is improved by the shielding member 130 according to an embodiment of the disclosure.

If a diameter of the wire 136 exceeds 0.14 mm, the shielding member 130 may act as a visual obstacle by a moire phenomenon or a stereogram phenomenon. Also, a person with a visual acuity of 1.0 can recognize from 0.15 mm to 0.16 mm at a distance of 50 cm. If the diameter of the wire 136 is 0.15 mm or more, the user may recognize the wire 136 of the shielding member 130 so as to recognize an image of the inside of the cooking chamber and an image of the shielding member 130 alternately.

On the other hand, if the diameter of the wire 136 is less than 0.1 mm, the diameter of the wire 136 is too thin so that there is a high possibility that the wire 136 will be deformed by an external impact, and when a heat-resistant material is sprayed and coated on the shielding member 130, the space between the wires 136 may be clogged. Therefore, it is preferable that the wire 136 of the shielding member 130 has a diameter of 0.1 mm to 0.14 mm.

For a woven material, mesh is used as a unit representing the number of meshes included in a 1 inch length. That is, the mesh unit means the number of wires arranged side by side per inch. Preferably, the shielding member 130 woven with a wire having a diameter of 0.1 mm to 0.14 mm is woven with 30 meshes or more and 50 meshes or less so that the wave leakage value is 0.2 mW or less per square centimeter. More preferably, if the diameter of the wire 136 is 0.14 mm, a shielding member 130 of 42 meshes may be preferably used, and if the diameter of the wire 136 is 0.1 mm, a shielding member 130 of 50 meshes may be preferably used.

The shielding member 130 may be woven by mixing two or more wires of different diameters. The shielding member 130 may be woven with a first wire (weft yarn 134) having a first diameter and disposed in a first direction and a second wire (warp yarn 135) having a second diameter and disposed in a second direction. The first diameter may be equal to or different from the second diameter. The first direction may be perpendicular to the second direction, or may form a predetermined angle which is different from 90 degrees with respect to the second direction. Further, the first wire and the second wire may be arranged in different meshes. That is, the first wire and the second wire may be arranged in different numbers per inch.

It is preferable that the shielding member 130 has an aperture ratio of 55% or more. The conventional multiple piercing hole panel can achieve an aperture ratio of 55% or more. However, since the wire 136 of the shielding member 130 according to the disclosure has a circular cross section, the amount of reflected light directly entering a user's eyes can be minimized, thereby improving visibility.

A heat-resistant coating (not shown) formed on the shielding member 130 may provide an effect of preventing corrosion and improving visibility as well as improving heat resistance. The shielding member 130 may be coated after additional plating to prevent corrosion. However, due to the property of the shielding member 130 woven with wires, it is difficult to ensure the uniformity of plating, and the plating increases the electrical resistance so that the wave leakage value rises, and due to an increase of surface temperature, a reliability problem may be caused. Thus, the shielding member 130 according to an embodiment of the disclosure may be coated with heat resistant materials that can withstand heat and chemicals in the absence of additional plating. A cleaning process may be performed prior to a coating process since an oil film may need to be removed from the surface of the shielding member 130 in order to form a heat-resistant coating directly on the shielding member 130.

Meanwhile, it is preferable to roughen the surface of the wire 136 of the shielding member 130 in order to improve the thickness and density of the heat-resistant coating and to maintain uniform coating quality at any location. As the surface of the wire 136 becomes rougher, the moire phenomenon may be more reduced.

The coating material may include a matting agent for improving visibility. The content of the matting agent may be 10% or less. When a matting agent of 10% is added, a gloss of the coating may be maintained at 10% or less. If no matting agent is added, visibility may be lowered due to the light reflex and overlapping of the coating material. If the content of the matting agent exceeds 10%, a gloss of the coating may be close to 0%, but the physical properties of the coating material may deteriorate.

As a coating method, electrodeposition coating and liquid spray coating may be used. In the case of powder coating, the space between the wires 136 may be clogged, which is undesirable.

The shielding member 130 used for the electrodeposition coating preferably has no excess oxide film on the surface. The shielding member 130 may be excessively oxidized (carbonized) on the surface by excess air (oxygen) and heat during the manufacturing process. In this case, the formation of the coating layer of the electrodeposition coating may be inhibited due to a decrease of electrical conductivity of the surface.

The coating material may contain a large amount of silicone in order to ensure heat resistance. The silicone contained in the coating material may be a polymer composed of a siloxane (Si—O—Si) having a functional group which may be a hydroxyl group (—OH), a methoxy group (—OCH3), a methyl group (—CH3) or a phenyl group (—C6H5). Particularly, the content of silicon Si may be preferably 2% or more and 10% or less. If the content of Si exceeds 10%, viscosity tends to increases so that the space between the wires 136 may be clogged. More preferably, the content of Si may be 2% or more and 7% or less.

Through the coating, a coating layer having an average thickness between 0.01 mm and 0.03 mm may be formed on the surface of the shielding member 130. If the thickness of the coating layer exceeds 0.03 mm, the space between the wires 136 may be clogged, and visibility may be lowered. Further, if the thickness of the coating layer is less than 0.01 mm, there are risks of peeling and corrosion.

In order to secure the heat resistance of the fixing member 140, the fixing member 140 may be also heat-resistant coated. The fixing member 140 may include a heat-resistant coating having a thickness between 0.01 mm and 0.05 mm.

Figure 9A:
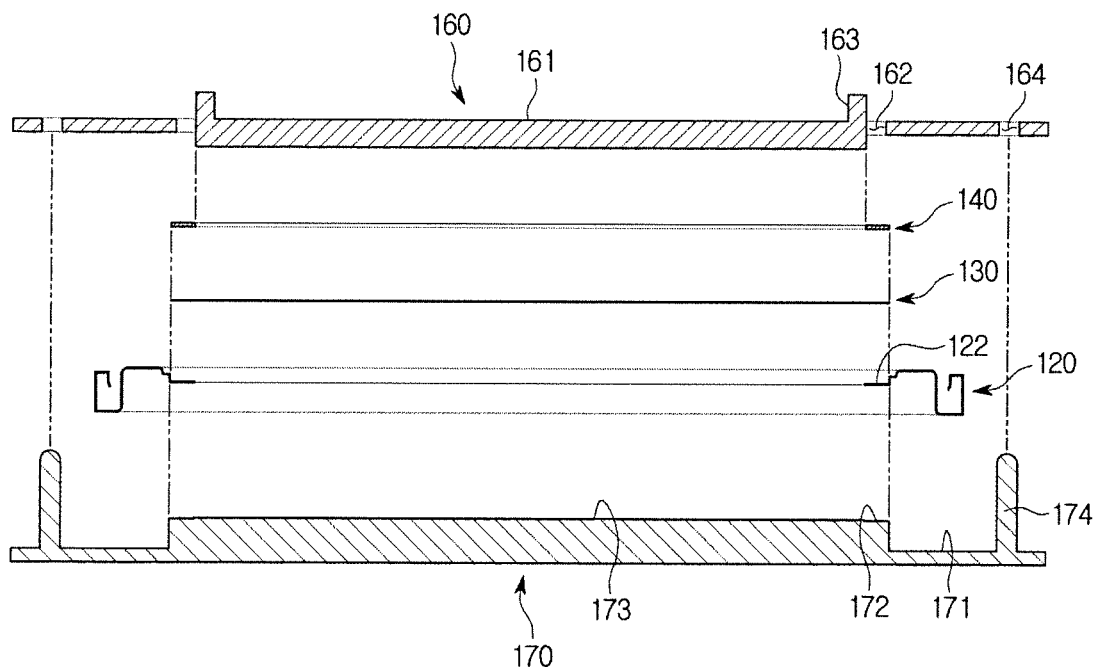
FIGS. 9A to 9C are cross-sectional views illustrating coupling of the fixing member, the shielding member, and the door frame according to an embodiment of the disclosure.
Figure 9B:
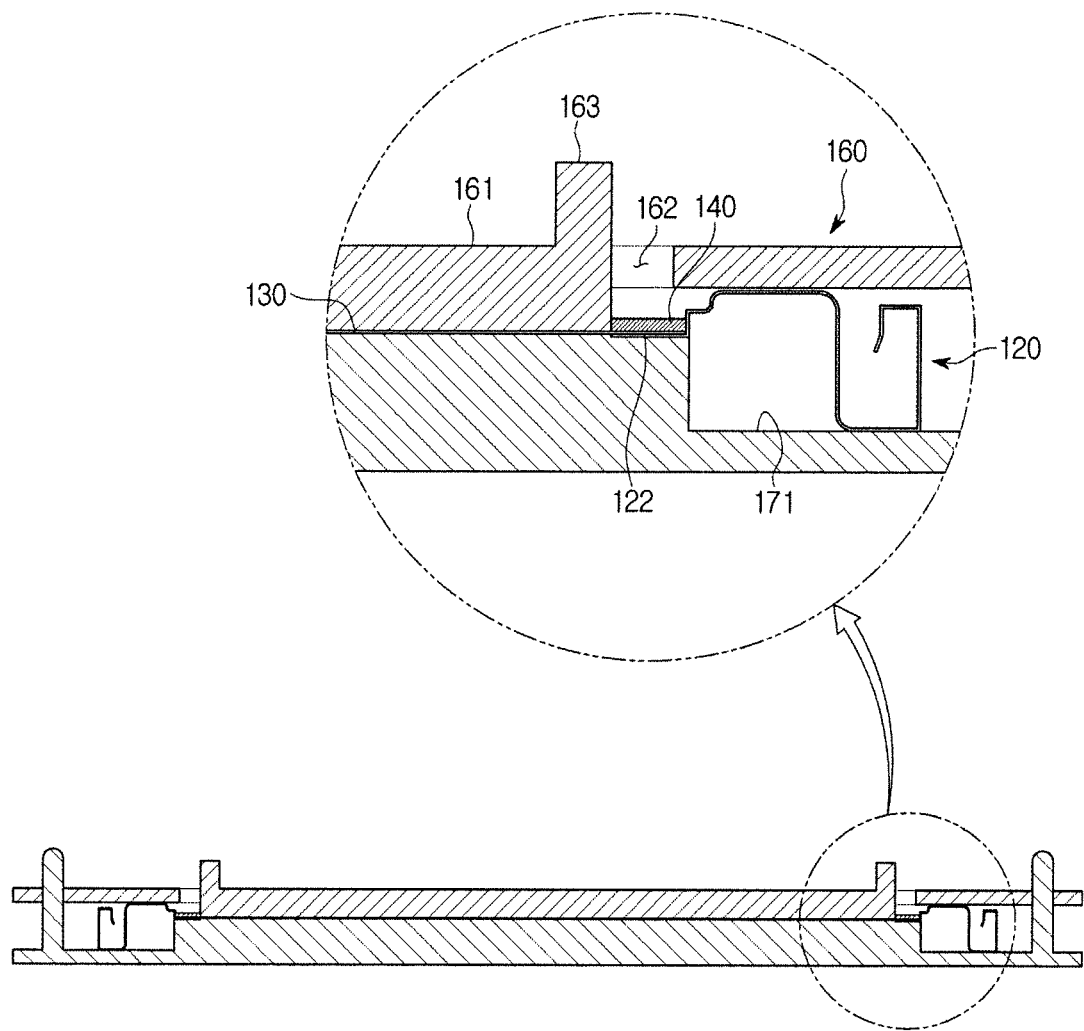
Figure 9C:
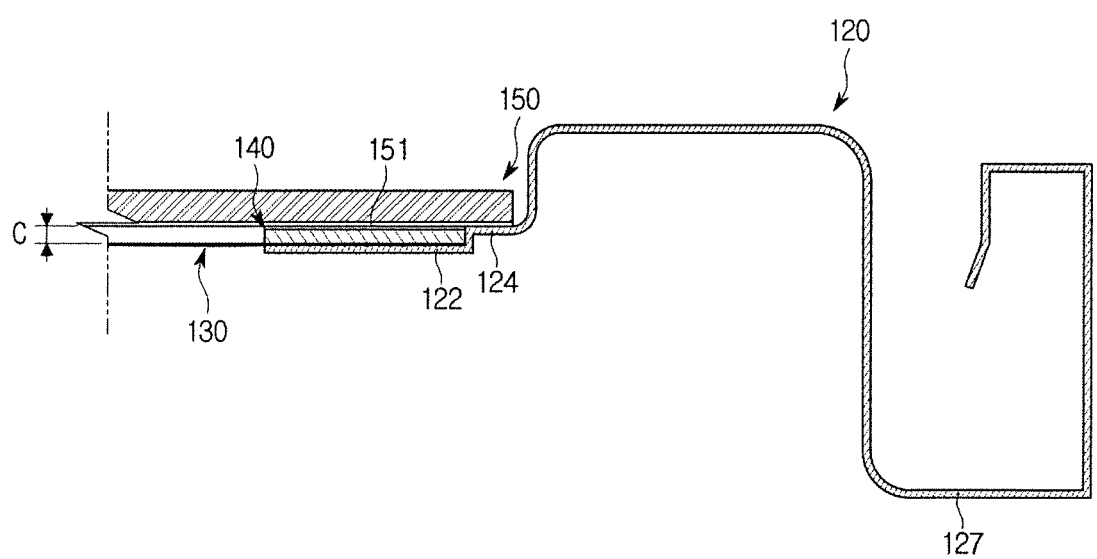

FIGS. 9A to 9C are cross-sectional views illustrating coupling of the fixing member, the shielding member, and the door frame according to an embodiment of the disclosure.

The shielding member 130 may be flexible because it is formed by weaving the wire 136, and contour-like stripes may be formed on the surface due to light reflection and the moire phenomenon. Accordingly, the shielding member 130 may need to be kept flat, and a method of fixing the shielding member 130 at the door frame 120 to be flat is needed.

Referring to FIGS. 9A and 9B, the shielding member 130 and the fixing member 140 may be coupled to the door frame 120 using jigs 160 and 170. First, the door frame 120 may be rested on the lower jig 170. The choke portion 127 of the door frame 120 may be rested on a chock resting portion 171 of the lower jig 170, and the flange 122 of the door frame 120 may be rested on a flange resting portion 172 of the lower jig 170.

Next, the shielding member 130 may be rested on the flange 122 of the door frame 120 so as to cover the opening 121 of the door frame 120. The shielding member 130 can be kept flat by the shielding member support 173 of the lower jig 170.

The fixing member 140 may be rested on the upper jig 160. The upper jig 160 may be provided with a flat portion 161 to keep the shielding member 130 flat when the lower jig 170 is coupled with the upper jig 160, and to prevent foreign substances from entering by welding. The flat portion 161 may be formed to correspond to the size and shape of the opening 121 of the door frame 120, and the fixing member 140 may be rested around the flat portion 161.

The upper jig 160 may be detachably coupled with the lower jig 170 such that the shielding member 130 is disposed between the fixing member 140 and the door frame 120. A coupling protrusion 174 may be formed on the lower jig 170, and a coupling hole 164 through which the coupling protrusion 174 of the lower jig 170 can pass may be formed on the upper jig 160. Although not shown in the drawings, a thread may be formed in the coupling protrusion 174 of the lower jig 170 so as to temporarily fix the upper jig 160 and the lower jig 170 with a fastener such as a nut after the upper jig 160 is coupled with the lower jig 170.

In the upper jig 160, an opening 162 for welding may be formed at a position corresponding to the fixing member 140 and the flange 122 of the door frame 120. The fixing member 140 may be welded to the flange 122 of the door frame 120 through the opening 162 of the upper jig 160, while keeping the shielding member 130 flat after engaging the upper jig 160 with the lower jig 170.

The upper jig 160 may include a barrier 163 formed between the opening 162 for welding and the flat portion 161 in order to prevent contamination due to by-products of welding. The barrier may be formed in the form of a wall along the opening 162.

After the fixing member 140 and the shielding member 130 are coupled to the door frame 120, the lower jig 170 and the upper jig 160 may be separated and removed.

After removing the lower jig 170 and the upper jig 160, a transparent screen 150 for protecting the shielding member 130 may be coupled to the door frame 120.

Referring to FIG. 9C, the screen 150 may be rested on a screen seating portion 124 of the door frame 120. The screen 150 may be disposed at a certain distance C from the shielding member 130. Since the shielding member 130 is formed by weaving a conductive wire, the shielding member 130 may expand and contract repeatedly due to heat. Accordingly, if the shielding member 130 is in contact with the screen 150, the shielding member 130 may be worn out so that the coating may peel off, and noise may be generated. In addition, the light reflected on the screen 150 may overlap while passing through the shielding member 130 to cause the moire phenomenon.

Therefore, in order to protect the shielding member 130 and improve the visibility of the shielding member 130, the screen 150 and the shielding member 130 may be disposed with a gap between 1.0 mm and 30 mm. The screen resting portion 124 of the door frame 120 may protrude a predetermined distance from the flange 122 on which the shielding member 130 is rested, and the screen 150 may be rested on the screen seating portion 124 of the door frame 120 to be spaced a certain distance from the shielding member 130. The screen 150 may include an antireflective layer 151 on the side facing the shielding member 130 to prevent reflection of light.

Figure 10A:
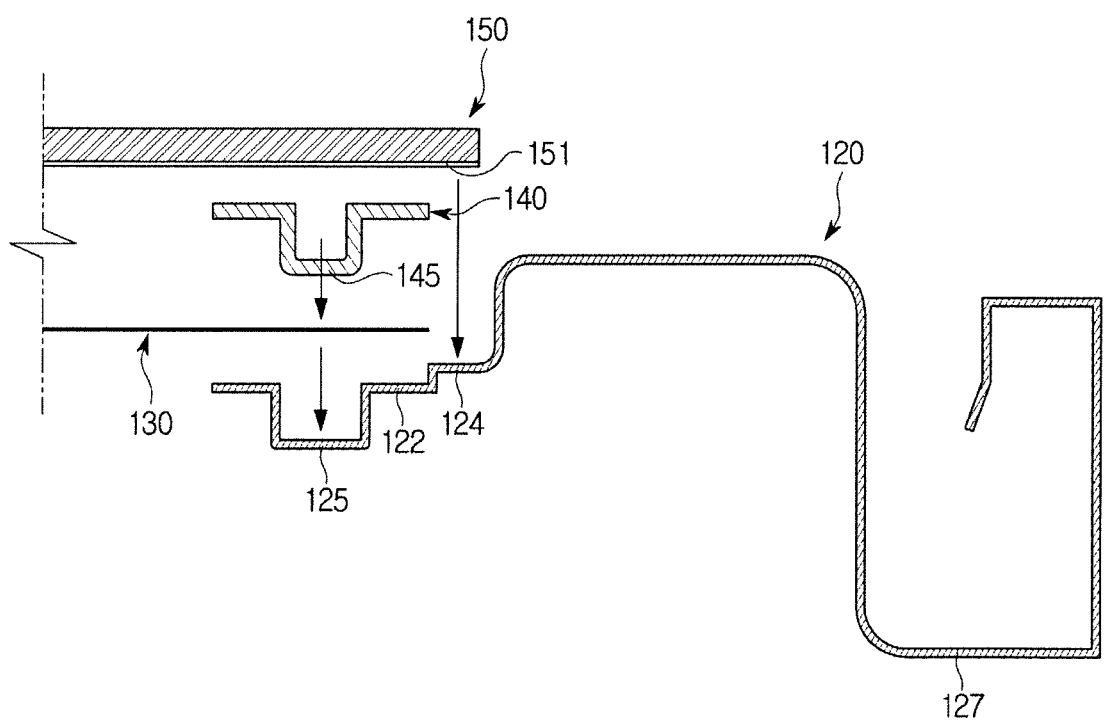
FIGS. 10A and 10B are cross-sectional views illustrating coupling of a fixing member, a shielding member, and a door frame according to another embodiment of the disclosure.
Figure 10B:
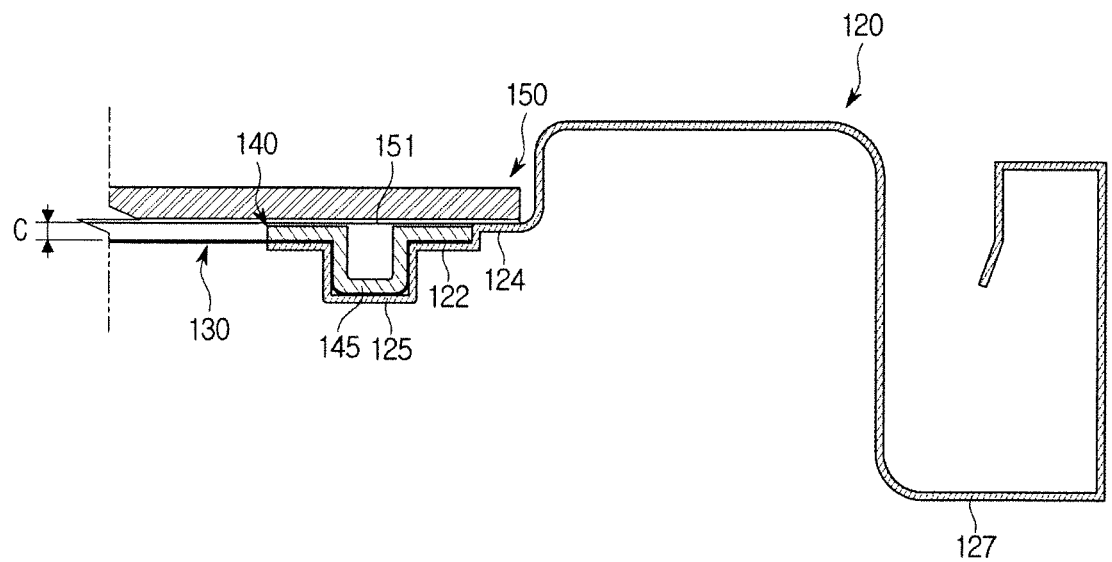

FIGS. 10A and 10B are cross-sectional views illustrating coupling of a fixing member, a shielding member, and a door frame according to another embodiment of the disclosure.

Referring to FIGS. 10A and 10B, the fixing member 140 according to another embodiment of the disclosure may include a protrusion 145 protruding toward the door frame 120, and the door frame 120 may include a recess 125 so that the shielding member 130 can be coupled to the door frame 120 to be flat. The recess 125 of the door frame 120 may be formed in the flange 122 to correspond to the protrusion 145 of the fixing member 140, and the protrusion 145 of the fixing member 140 may be inserted into the recess 125.

Because the shielding member 130 is flexible, the shielding member 130 may be deformed when the protrusion 145 of the fixing member 140 is inserted into the recess 125 of the door frame 120, to thus be inserted into the recess 125 of the door frame. When the protrusion 145 of the fixing member 140 is inserted into the recess 125 of the door frame 120, the shielding member 130 may receive a tensile force to be kept flat.

Accordingly, the shielding member 130 may be coupled to the door frame 120 to be flat, without the help of a jig or the like, by the protrusion 145 of the fixing member 140 and the recess 125 of the door frame 120. The fixing member 140 may be welded to the flange 122 of the door frame 120 so that the shielding member 130 and the door frame 120 may be electrically connected reliably, even if the coupling of the recess 125 of the door frame 120 and the protrusion 145 of the fixing member 140 may result in a certain degree of bonding force.

According to an embodiment of the disclosure, a fixing structure for coupling a shielding member without a separate fixing member may be provided on the door frame.

Figure 11A:
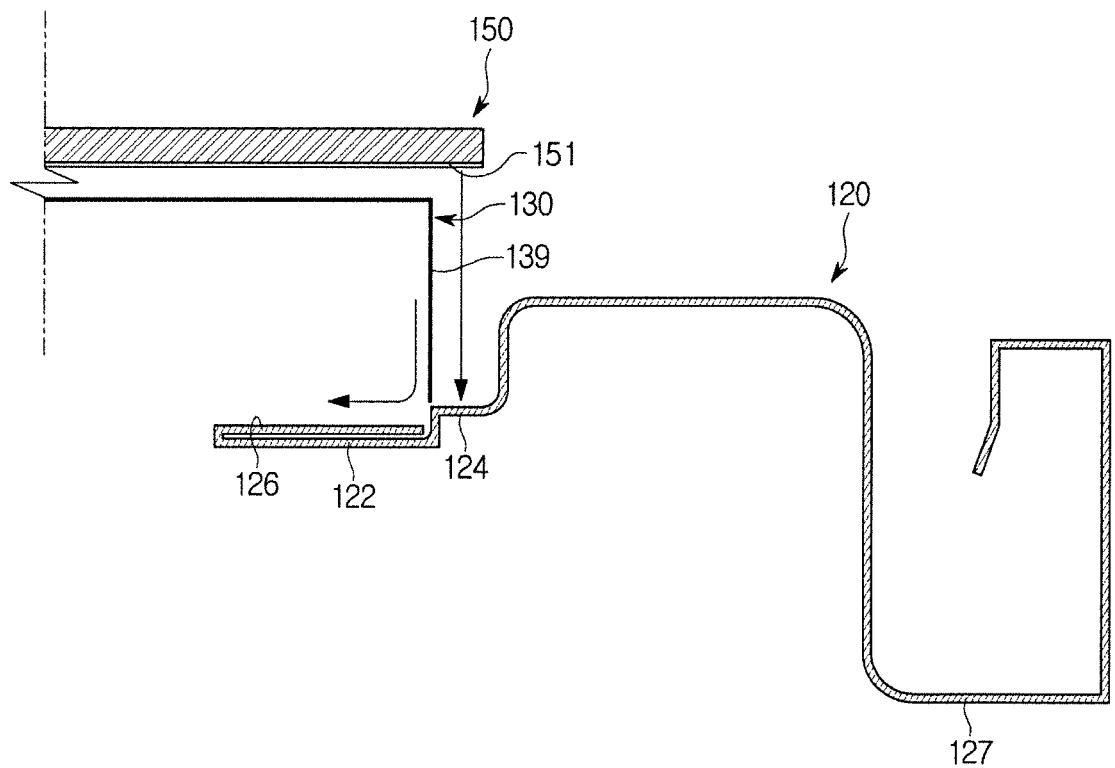
FIGS. 11A and 11B are cross-sectional views illustrating coupling of a shielding member and a door frame according to an embodiment of the disclosure.
Figure 11B:
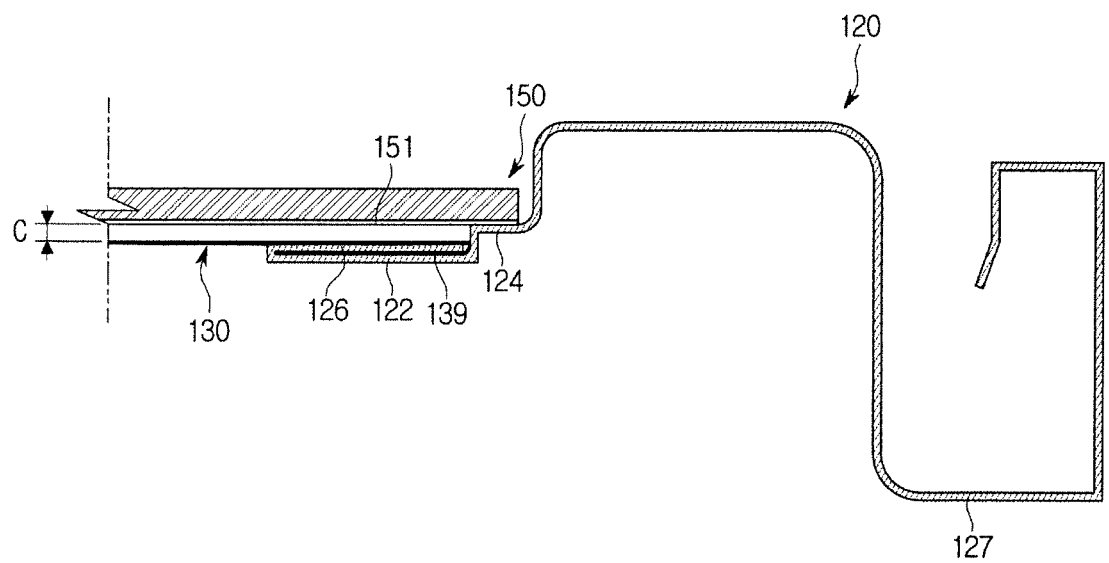

FIGS. 11A and 11B are cross-sectional views illustrating coupling of a shielding member and a door frame according to an embodiment of the disclosure.

Referring to FIGS. 11A and 11B, a door frame 120 may include a groove 126 which is formed around the opening 121 and into which at least one end of the shielding member 130 is inserted. The groove 126 may be bent toward the choke portion 127. The groove 126 may be formed by bending the flange 122 from the opening 121 to the screen seating portion 124, and the entrance of the groove 126 may be formed between the flange 122 and the screen resting portion 124.

The shielding member 130 may include a bent portion 139 extending from the at least one end of the shielding member 130 by the width of the groove 126. The bent portion 139 may be inserted into the groove 126 of the door frame 120 so that the shielding member 130 may be fixed at and electrically connected to the door frame 120.

Figure 12A:
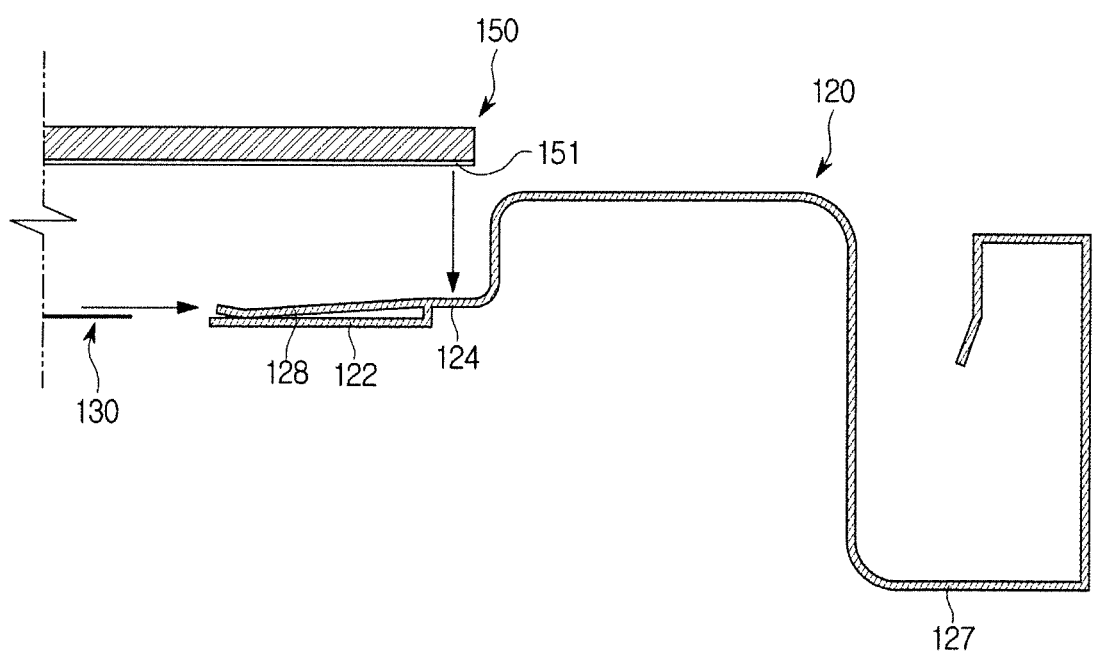
FIGS. 12A and 12B are cross-sectional views illustrating coupling of a shielding member and a door frame according to another embodiment of the disclosure.
Figure 12B:
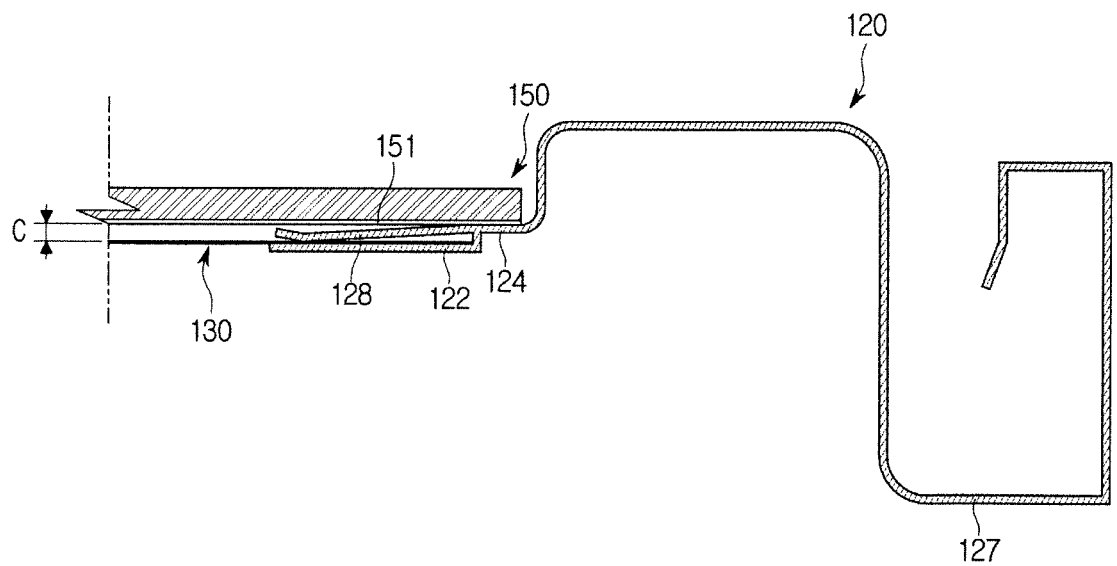

FIGS. 12A and 12B are cross-sectional views illustrating coupling of a shielding member and a door frame according to another embodiment of the disclosure.

Referring to FIGS. 12A and 12B, the door frame 120 may include a pressing member 128 formed around the opening 121 and capable of pressing and fixing at least one end of the shielding member 130. The pressing member 128 may be provided to press the shielding member 130 toward the flange 122 when one end of the shielding member 130 is inserted between the pressing member 128 and the flange 122. The pressing member 128 may be provided on the flange 122 in the form of a clip or a clamp.

At least one end of the shielding member 130 may be inserted between the pressing member 128 and the flange 122 of the door frame 120 so that the shielding member 130 can be fixed at and electrically connected to the door frame 120 by the pressing member 128.

According to the cooking appliance as described above, electromagnetic waves can be prevented from leaking out by the shielding member, and a user can check a cooking state of food in the cooking chamber without opening the door during cooking.

In addition, according to the method of fixing the shielding member at the door, as described above, the shielding member may be fixed on the door frame of the door to be flat without being damaged.

Although example embodiments of the disclosure have been shown and described, it would be appreciated by those skilled in the art that changes may be made to these embodiments without departing from the principles and spirit of the disclosure, the scope of which is defined in the claims and their equivalents.

What is claimed is:

1. A cooking appliance, comprising:
a main body having a cooking chamber; and
a door configured to open or close the cooking chamber, the door including:
a door frame having an opening and a conductive flange formed around the opening of the door frame,
a shielding member to be disposed at the door frame and be in contact with the conductive flange around the opening of the door frame and cover the opening of the door frame, the shielding member having a plurality of conductive wires crossing each other and a heat-resistant coating,
a fixing member having a shape corresponding to the conductive flange of the door frame and having an opening formed to align with the opening of the door frame, the fixing member being formed to connect an outermost perimeter of the plurality of conductive wires of the shielding member to the conductive flange of the door frame while the fixing member is coupled to the door frame and the shielding member is disposed in between the door frame and the fixing member, and
a screen provided on an opposite side of the fixing member from the shielding member, the screen being spaced apart by a predetermined distance from the shielding member by the fixing member, and
wherein the outermost perimeter of the plurality of conductive wires of the shielding member is formed to correspond to an outermost perimeter of the fixing member, such that an outermost size and outermost shape of the plurality of conductive wires of the shielding member and the fixing member correspond to each other and are aligned in the door frame,
wherein the fixing member includes an engaging portion formed to pass through the shielding member to be coupled to the door frame, and the fixing member further includes a protrusion formed to protrude toward the door frame,
the door frame includes an engaged portion formed on the conductive flange to be welded to the engaging portion of the fixing member, and the door frame further includes a recess into which the protrusion is inserted, and
the shielding member is pressed by the protrusion so as to be inserted into the recess.

2. The cooking appliance of claim 1, wherein the plurality of conductive wires have a diameter of 0.1 mm to 0.14 mm, and 30 to 50 conductive wires among the plurality of conductive wire are arranged side by side per inch.

3. The cooking appliance of claim 1, wherein
the plurality of conductive wires include a first conductive wire arranged in a first direction and a second conductive wire arranged in a second direction,
a diameter of the first conductive wire is different from a diameter of the second conductive wire, and
a number of the first conductive wire arranged per inch is different from a number of the second conductive wire arranged per inch.

4. The cooking appliance of claim 1, wherein the plurality of conductive wires include at least one of stainless steel, platinum, copper, nickel, chromium, titanium, and carbon nanotubes.

5. The cooking appliance of claim 1, wherein a thickness of the heat-resistant coating is between 0.01 mm and 0.03 mm.

6. The cooking appliance of claim 1, wherein
the heat-resistant coating includes silicon, and
content of silicon is between 2% and 10%.

7. The cooking appliance of claim 1, wherein
the heat-resistant coating includes a matting agent, and
content of the matting agent is 10% or less.

8. The cooking appliance of claim 1, wherein
the screen is formed of a transparent material.

9. The cooking appliance of claim 8, wherein the screen includes an antireflective layer on a side facing the shielding member.

10. The cooking appliance of claim 1, wherein the fixing member further includes a reinforcing portion formed to cross the opening of the fixing member and connect sides of the fixing member.

11. A door for a cooking appliance, comprising:
a door frame having an opening and a conductive flange formed around the opening of the door frame;
a shielding member to be disposed at the door frame and be in contact with the conductive flange around the opening of the door frame and cover the opening of the door frame, the shielding member having a plurality of conductive wires crossing each other and a heat-resistant coating;

a fixing member having a shape corresponding to the conductive flange of the door frame and having an opening formed to align with the opening of the door frame, the fixing member being formed to connect an outermost perimeter of the plurality of conductive wires of the shielding member to the conductive flange of the door frame while the fixing member is coupled to the door frame and the shielding member is disposed in between the door frame and the fixing member;

a screen provided on an opposite side of the fixing member from the shielding member, the screen being spaced apart by a predetermined distance from the shielding member by the fixing member, and wherein the outermost perimeter of the plurality of conductive wires of the shielding member is formed to correspond to an outermost perimeter of the fixing member, such that an outermost size and outermost shape of the plurality of conductive wires of the shielding member and the fixing member correspond to each other and are aligned in the door frame, wherein the fixing member includes an engaging portion passing through the shielding member to be coupled to the door frame, and the fixing member further includes a protrusion protruding toward the door frame, the door frame includes an engaged portion formed on the conductive flange to be welded to the engaging portion, and the door frame further includes a recess into which the protrusion is inserted, and the shielding member is pressed by the protrusion so as to be inserted into the recess.

12. The door of claim 11, wherein the plurality of conductive wires include a first conductive wire arranged in a first direction and a second conductive wire arranged in a second direction, a diameter of the first conductive wire is different from a diameter of the second conductive wire, and a number of the first conductive wire arranged per inch is different from a number of the second conductive wire arranged per inch.

13. The door of claim 11, wherein the screen is formed of a transparent material.

* * * * *